Sept. 6, 1932.  D. J. P. PHILLIPS  1,876,432
PRODUCTION OF RUBBER SHEETS
Filed March 16, 1929
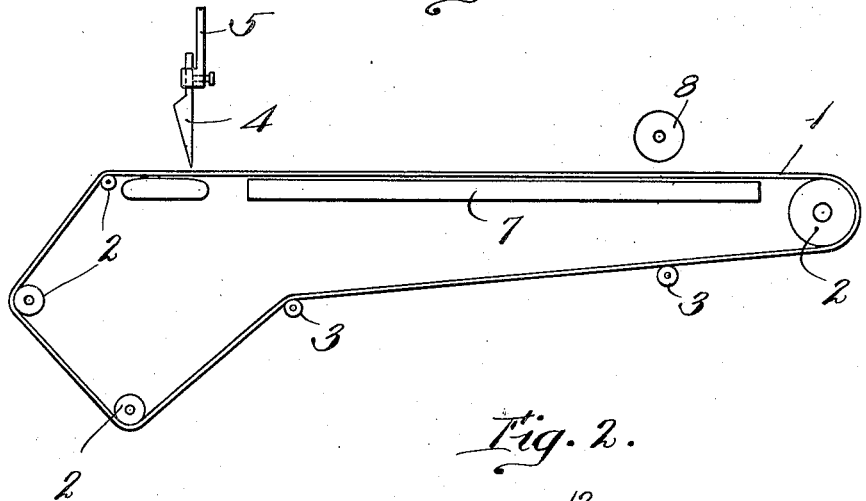
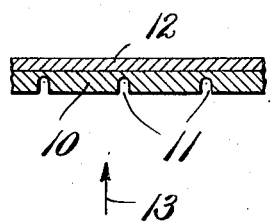
Inventor
David John Pritchard Phillips
by Holton, Murray & Cole
Attys.

Patented Sept. 6, 1932

1,876,432

UNITED STATES PATENT OFFICE

DAVID JOHN PRITCHARD PHILLIPS, OF LONDON, ENGLAND, ASSIGNOR OF ONE HALF TO JAMES BARRET CROCKETT, OF CAMBRIDGE, MASSACHUSETTS

PRODUCTION OF RUBBER SHEETS

Application filed March 16, 1929, Serial No. 347,693, and in Great Britain October 7, 1927.

This invention consists in improvements in or relating to the production of rubber sheets, and particularly to the production of coloured and parti-coloured sheets.

According to the present invention, a process for the production of such sheets consists in imposing on a sheet of rubber of one colour a sheet which is of a different colour, and comprises latex (or a latex mix) either vulcanized or unvulcanized, from which rubber is subsequently deposited in position on the first-named sheet. Preferably, the process consists in forming the first sheet by spreading a thin layer of latex on a support on which it remains while the rubber is deposited therefrom, thereafter applying to the rubber sheet thus produced the second differently coloured sheet referred to above and providing for the exposing or showing of one coloured sheet through the other coloured sheet at a multiplicity of places.

Throughout the specification, the term "latex" will be employed for brevity to indicate either pure latex or a latex mix either in a vulcanized or unvulcanized condition.

The process according to the present invention can be carried out in a number of different ways, and the following specifically described methods are given as examples only of various ways in which the invention can be carried into effect.

In the first method to be described, apparatus substantially that which is diagrammatically illustrated in Figure 1 of the accompanying drawing can be employed.

Figure 2 is a transverse section of the finished compound sheet of rubber on an enlarged scale intended to indicate diagrammatically the effect produced by this first method.

The apparatus indicated in Figure 1 comprises a supporting endless band or cloth 1. The surface of this band is formed with any desired raised pattern according to the parti-coloured pattern to be produced in intaglio on the finished rubber sheet. It is carried over several rollers 2 so that the upper lap of the band is substantially horizontal. In the vicinity of that end of the band at which the latex is delivered, there is a fixed guide 3 or rollers beneath the band and a spreading knife 4 above it. The height of the edge of the knife above the band is adjustable as, for example, by holding the knife in a clamping device 5 in which it can be movably adjusted.

Latex is delivered, for instance, by pouring from a can, across the width of the band 1 behind the knife 4 considered in the direction of movement of the band. The knife 4 serves to spread the latex in known manner uniformly over the surface of the band so that if the latter had a smooth outer surface the thickness of the spread film would be uniform across the whole width of the band. The latter, however, has an embossed surface so that the rubber sheet produced will be relatively thin where the raised portions of the surface occur, and relatively thick in the hollow portions thereof. This is shown in Figure 2 where the rubber sheet is indicated at 10 on a much enlarged scale, and the hollows produced by the embossed surface of the band are indicated at 11.

After the rubber has been spread by the knife 4, the band is carried over a heated table 7 which serves to evaporate the water content in the latex and to deposit the rubber in a coherent sheet on the band 1. Any desired number of coats may be thus applied, one on the other, until a rubber sheet of the desired thickness is obtained. Thereafter, the process is repeated, that is to say, on the sheet thus formed there is deposited a second sheet of any desired number of coats of latex which is coloured differently from that of the first sheet. The latex may be coloured by water-soluble dyes, by pigments or other suitable colouring matter admixed therewith, and the colour of the second applied sheet will show through the original sheet where the latter is relatively thin by reason of the embossed pattern on the band 1. For instance, as indicated in Figure 2, the second sheet is represented at 12 and when the sheet is viewed in the direction of the arrow 13, the colour of the sheet 12 will show through at the places 11. The height of the spreading edge of the knife 4 is adjusted for each coat so as to give it the required thickness.

In a second method of applying the invention, the band 1 may have a smooth supporting surface for the latex and a coloured surface having a mottled appearance can be given to the rubber sheet in the following manner:—

The latex is applied and spread in the manner as above described, and before it is spread there will be added to it an immiscible liquid, such as oil, which will form globules in the latex and will evaporate readily when the band passes over the table 7. Thus, wherever the oil evaporates from the latex, it will leave portions in the rubber sheet which are relatively thin. In other words, the surface of the rubber sheet will be pitted. If thereafter a second and differently coloured sheet of latex be applied, the compound sheet, as viewed from one of its surfaces, will have a parti-coloured mottled effect.

According to a third method of practising the invention, the latex is spread on a band such as 1, having a smooth supporting surface. As it passes across the table 7 the rubber becomes deposited and at one position on the table the sheet has attained a plastic condition in which it can be embossed by an impression-roller and retain the impression. For instance, in Figure 1, the embossing-roller is indicated at 8. After the embossed sheet thus prepared has been dried by further passage over the table, the second sheet of a different colour is then formed on the originally prepared sheet and, as in the case of the previously described examples, the compound sheet will, when viewed from one side, have a parti-coloured effect. The difference between the sheet produced by the first specific method and this last described method is that in the first case the parti-coloured surface will also be an embossed surface, whereas in the second case the parti-coloured surface can either be a smooth surface or rough surface according as to whether the embossing is carried out on the first or last coats.

What I claim is:—

1. A method of making a multi-colored sheet of rubber, which comprises depositing and drying latex of one color as a layer having localized areas of sufficiently reduced thickness to permit the transmission of light therethrough, and superposing and drying on said first-mentioned layer a second layer of latex of another color, whereby said second color is transmitted through said localized areas.

2. A method of making a multi-colored sheet of rubber, which comprises depositing and drying latex of one color as a layer, superposing and drying on said first-mentioned layer a second layer of latex of another color, and impressing in one of said layers on at least one face thereof a design in intaglio and of sufficient depth to permit the color of the superposed layer to show through said design.

3. A method of making a multi-colored sheet of rubber, which comprises depositing and drying latex of one color as a layer, superposing and drying on said first-mentioned layer a second layer of latex of another color, and impressing in at least one face of said first-mentioned layer and before the superposition of said second-mentioned layer a design in intaglio and of sufficient depth to permit the color of the superposed layer to show through said design.

4. A method of making a multi-colored sheet of rubber, which comprises depositing and drying latex of one color as a layer, superposing and drying on said first-mentioned layer a second layer of latex of another color, and impressing on at least one face of said first-mentioned layer while it is being formed and before the superposition of said second-mentioned layer a design in intaglio and of sufficient depth to permit the color of the superposed layer to show through said design.

DAVID JOHN PRITCHARD PHILLIPS.